(12) United States Patent
Nam

(10) Patent No.: US 12,098,659 B2
(45) Date of Patent: Sep. 24, 2024

(54) EXHAUST GAS FLOW REGULATOR AND HEAT RECOVERY STEAM GENERATOR HAVING SAME

(71) Applicant: DOOSAN ENERBILITY CO., LTD., Changwon (KR)

(72) Inventor: Gyeong Mo Nam, Yongin (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/354,324

(22) Filed: Jul. 18, 2023

(65) Prior Publication Data
US 2024/0052761 A1 Feb. 15, 2024

(51) Int. Cl.
| | | |
|---|---|---|
| *F01N 3/28* | (2006.01) | |
| *F01D 9/04* | (2006.01) | |
| *F01K 25/10* | (2006.01) | |
| *F16K 1/16* | (2006.01) | |

(52) U.S. Cl.
CPC .............. *F01K 25/10* (2013.01); *F01D 9/041* (2013.01); *F01N 3/2892* (2013.01); *F16K 1/165* (2013.01); *F01N 2240/20* (2013.01); *F05B 2240/122* (2013.01); *Y02E 20/16* (2013.01)

(58) Field of Classification Search
CPC ......... Y02E 20/16; F01K 23/06; F01K 23/10; F01K 23/101; F01K 25/10; F02C 6/18; F01N 3/2892; F01N 13/00; F01N 13/002; F01N 2240/20; F16K 1/16; F16K 1/165; F01D 17/14; F01D 17/16; F01D 17/162; F01D 17/165; F01D 9/041; F22B 1/18; F22B 1/1807; F22B 1/1815; F05B 2240/122

See application file for complete search history.

(56) References Cited

U.S. PATENT DOCUMENTS

| | | | | |
|---|---|---|---|---|
| 3,894,481 A | * | 7/1975 | Alley ...................... | F24F 13/15 49/92.1 |
| 5,267,434 A | * | 12/1993 | Termuehlen ............ | F01K 23/10 60/39.182 |
| 2018/0142956 A1 | | 5/2018 | Freund | |
| 2020/0284426 A1 | | 9/2020 | Magee | |

FOREIGN PATENT DOCUMENTS

| | | |
|---|---|---|
| DE | 19737507 A1 | 3/1999 |
| EP | 3828464 A1 | 6/2021 |
| KR | 10-2012-0058598 A | 6/2012 |
| KR | 10-2017-0074440 A | 6/2017 |

* cited by examiner

*Primary Examiner* — Loren C Edwards
(74) *Attorney, Agent, or Firm* — Harvest IP Law, LLP

(57) ABSTRACT

An exhaust gas flow regulator and a heat recovery steam generator including the same are provided. The exhaust gas flow regulator includes a plurality of first tubes spaced apart from each other in a vertical direction, a support plate disposed in a direction perpendicular to the extension direction of the first tubes and through which the plurality of first tubes penetrates, and a second tube disposed at one or both ends of the support plate so as to be coupled to the support plate and extending parallel to the first tubes, wherein the second tube is provided with a guide plate disposed to redirect exhaust gases flowing adjacent to the second tube toward the first tube.

19 Claims, 13 Drawing Sheets

EXHAUST GAS FLOW REGULATOR AND HEAT RECOVERY STEAM GENERATOR HAVING SAME

CROSS REFERENCE TO RELATED APPLICATION

The present application claims priority to Korean Patent Application No. 10-2022-0101232, filed on Aug. 12, 2022, the entire contents of which are incorporated herein for all purposes by this reference.

BACKGROUND OF THE INVENTION

1. Field of the Invention

The present disclosure relates to an exhaust gas flow regulator and a heat recovery steam generator including the same. More particularly, the present disclosure relates to an exhaust gas flow regulator capable of improving exhaust gas flow deviation and a heat recovery steam generator including the same.

2. Description of the Background Art

In general, a combined cycle power generation system includes a gas turbine system that combusts fuel to generate high-pressure and high-temperature combustion gases and uses this high-temperature and high-pressure combustion gas to drive a gas turbine to generate electricity, a heat recovery steam generator (HRSG) that drives the gas turbine and recovers the heat of the discharged combustion gases, and a steam turbine system that uses high-temperature and high-pressure steam generated by the heat recovery steam generator to drive a steam turbine to generate electricity.

The HRSG is a combined cycle facility that does not discharge, into the atmosphere, but re-utilizes the high-temperature exhaust gases generated by the gas turbine to generate steam and rotate the steam turbine.

Specifically, the HRSG used in combined cycle power generation is connected to an outlet of the gas turbine to recover heat of the discharged high-temperature exhaust gases while bypassing the exhaust gases. The HRSG is composed of an evaporator that converts saturated liquid into saturated steam, a superheater that heats the saturated steam to a high temperature, and an economizer that is designed to be heated to a temperature condition required by the steam turbine so as to heat feedwater introduced from a condenser into a saturated liquid.

However, in a conventional HRSG, a flow of exhaust gases is not homogenized. Accordingly, when the gas turbine exhaust (GTE) enters the HRSG, a flow of GTE develops into a completely turbulent flow, being in a highly uneven state in terms of flow rate and temperature.

Therefore, it is necessary to consider an apparatus to homogenize a flow of exhaust gases to improve the efficiency of the heat recovery steam generator and prevent damage to a heat transfer tube of the high pressure superheater.

The foregoing is intended merely to aid in the understanding of the background of the present disclosure, and is not intended to mean that the present disclosure falls within the purview of the related art that is already known to those skilled in the art.

SUMMARY OF THE INVENTION

Accordingly, the present disclosure has been made keeping in mind the above problems occurring in the related art, and an objective of the present disclosure is to provide an exhaust gas flow regulator capable of homogenizing a flow of exhaust gases to improve the efficiency of a heat recovery steam generator and prevent damage to a heat transfer tube or the like of a high pressure superheater, and a heat recovery steam generator (HRSG) including the same.

According to an aspect of the present disclosure, there is provided an exhaust gas flow regulator including: a plurality of first tubes spaced apart from each other in a vertical direction; a support plate disposed perpendicular to an extension direction of the plurality of first tubes and through which the plurality of first tubes penetrates; and a second tube disposed at one or both ends of the support plate, configured to be coupled to the support plate, and extending parallel to the vertical direction, wherein the second tube is provided with a guide plate configured to redirect exhaust gases flowing around the second tube toward the plurality of first tubes.

In one embodiment, the second tube may be disposed at both ends of the support plate, and the guide plate may be disposed at either of the second tube disposed at both ends of the support plate.

In one embodiment, the guide plate may be rotatably connected to the second tube so that a flow direction of the exhaust gases flowing between the second tube and a first tube of the plurality of the first tubes adjacent to the second tube is directed toward the first tube.

In one embodiment, the exhaust gases may flow from one side of the plurality of first tubes to the other side, and the guide plate may be configured to redirect the exhaust gases flowing from one side of the plurality of first tubes toward the other side.

In one embodiment, the exhaust gas flow regulator may further include a coupling plate having one end coupled to the second tube disposed on both sides of the support plate and the other end coupled to an end of the support plate, wherein the support plate and the coupling plate may be coupled together by bolts.

In one embodiment, both ends of the support plate may be provided with bolt holes formed for engagement with the coupling plate, and one of the bolt holes may be formed as a long hole extending in the vertical direction.

In one embodiment, the second tube may further include an edge plate rotatably coupled to the second tube.

In one embodiment, the edge plate may be connected to a side of the second tube that is opposite to a location where the support plate is coupled to the second tube.

According to another aspect of the present disclosure, there is provided a heat recovery steam generator (HRSG) designed to facilitate the recovery of heat from high-temperature combustion exhaust gases discharged from a gas turbine, the HRSG including: at least one stack; a heat transfer tube unit disposed on a lower side of the stack; an air duct including a plurality of flow paths having different cross-sectional areas and through which the exhaust gases flow from the gas turbine to the stack; and an exhaust gas flow regulator disposed in the air duct, the exhaust gas flow regulator including: a plurality of first tubes spaced apart from each other in a vertical direction; a support plate disposed perpendicular to an extension direction of the plurality of first tubes and through which the plurality of first tubes penetrates; and a second tube disposed at one or both ends of the support plate, configured to be coupled to the support plate, and extending parallel to the vertical direction, wherein the second tube is provided with a guide plate configured to redirect exhaust gases flowing around the second tube toward the plurality of first tubes.

In one embodiment, the air duct may include a first flow path into which exhaust gases from the gas turbine are introduced, a second flow path extending from the first flow path and having a cross-sectional area extending in a width direction of the air duct, and a third flow path extending diagonally from the second flow path in a height direction of the air duct.

In one embodiment, the exhaust gas flow regulator may be positioned on both sides of the width direction on an inlet portion of the second flow path, and each of the first exhaust gas flow regulator is installed in the height direction.

In one embodiment, the guide plate may be disposed on the second tube that is positioned at a predetermined distance from a surface forming the air duct.

In one embodiment, the guide plate may be disposed such that a flow direction of the exhaust gases flowing from the first flow path to the second flow path is diverted toward the plurality of first tubes.

In one embodiment, the guide plate may be disposed to allow the exhaust gases to flow away from the surface of the air duct forming the second flow path.

In one embodiment, the exhaust gas flow regulator may be positioned on both sides of an inlet portion of the third flow path, in a direction where a flow path transitions from the second flow path to the third flow path.

In one embodiment, the guide plate may be disposed to allow the exhaust gases to flow toward a center of the third flow path.

In one embodiment, the second tube may further include an edge plate rotatably coupled to the second tube, the edge plate being disposed between the surface forming the air duct and the second tube.

The effects of the exhaust gas flow regulator and the heat recovery steam generator including the same according to the present disclosure will be described as follows.

In the exhaust gas flow regulator according to one embodiment of the present disclosure, the coupling plate coupled with the second tube, and the support plate having the vertically extending long hole are connected to each other by bolts so that the bolts are movable along the long hole, providing the effect of absorbing thermal expansion of the support plate.

As such, the exhaust gas flow regulator according to one embodiment of the present disclosure has the effect of diffusing the exhaust gases flowing along the outer side of the flow path toward the center of the flow path by being disposed along both sides of the surface to be changed when the width or height of the flow path is changed.

Further, the exhaust gas flow regulator according to embodiments of the present disclosure occupies only a portion of the cross-sectional area of the air duct flow path, thereby having the effect of reducing the resistance to exhaust gases flowing through the center of the air duct flow path. Specifically, since the exhaust gas flow regulator is disposed close to the surface of the flow path, the regulator only regulates the flow of exhaust gases along the surface of the flow path without providing resistance to the exhaust gases flowing through the center of the flow path, thereby having the effect of facilitating the flow of the exhaust gases flowing through the center of the flow path.

Furthermore, the exhaust gas flow regulator according to embodiments of the present disclosure occupies only a small portion of the cross-sectional area of the air duct flow path, thereby having the effect of reducing the number of parts required to construct the heat recovery steam generator and reducing the time required for assembly.

DETAILED DESCRIPTION OF THE INVENTION

It should be noted that the technical terms used in this specification are used only to describe certain embodiments and are not intended to limit the invention. In addition, singular elements used herein include the plural elements unless the context is clearly stated otherwise. As used herein, the terms "module" and "unit" for components are given or used solely for ease of description and the module or unit itself is not intended to have a distinct meaning or role from each other.

In this specification, the terms "comprising" or "including", or the like should not be construed as necessarily including all of the various components or steps described herein, but rather as not including some of the components or steps, or as including additional components or steps.

Further, in describing the technology disclosed herein, specific descriptions of related prior art will be omitted if it is determined that such detailed description would obscure the essence of the technology disclosed herein.

Furthermore, it is to be understood that the accompanying drawings are intended only to facilitate understanding of the embodiments disclosed herein, and the technical ideas disclosed herein are not limited by the accompanying drawings and include all modifications, equivalents, or substitutions that are within the spirits and technical scopes of the invention. It is also understood that each of the embodiments described below, as well as combinations of the embodiments are modifications, equivalents, or substitutions that fall within the spirits and technical scopes of the present disclosure.

Figure 1:
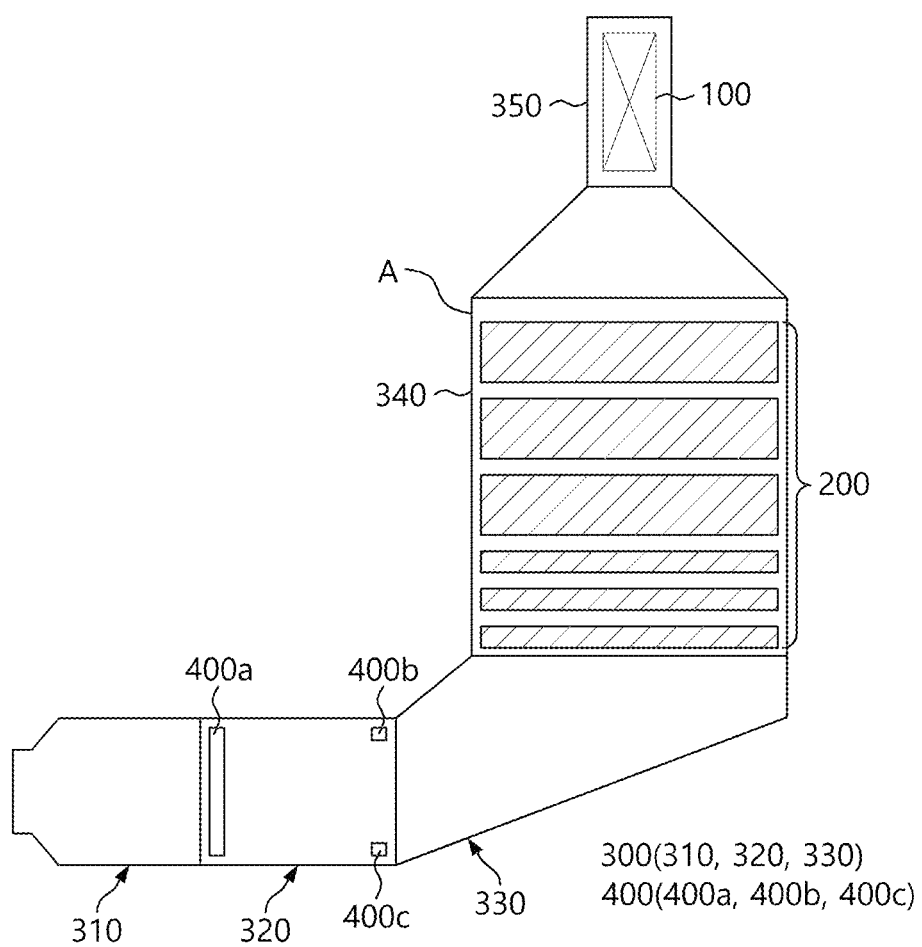
FIG. 1 is a diagrammatic illustration of a heat recovery steam generator (HRSG) according to an embodiment of the present disclosure.

FIG. 1 is a diagrammatic illustration of a heat recovery steam generator (HRSG) according to an embodiment of the present disclosure.

Figure 2:
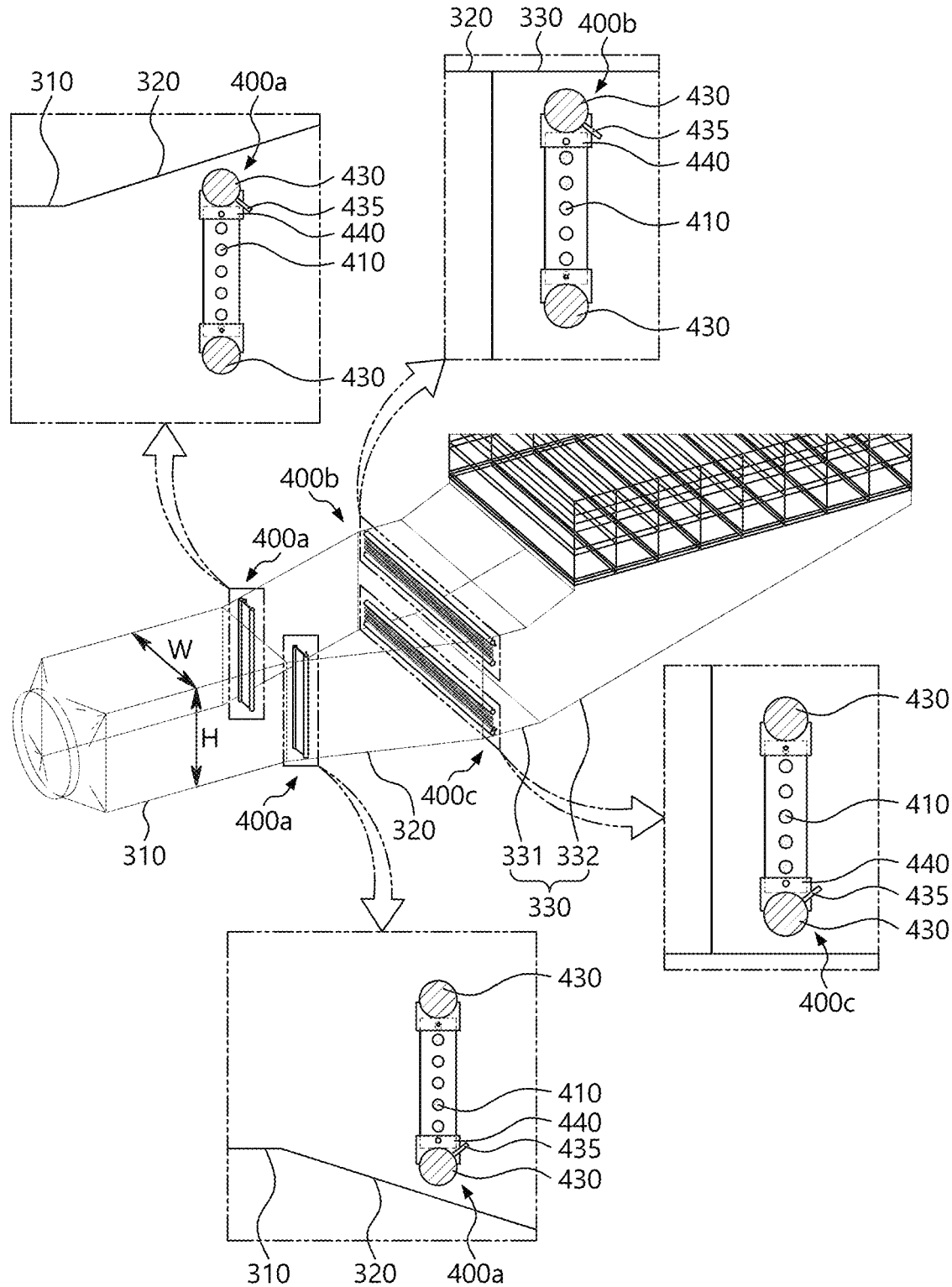
FIG. 2 is a perspective view to illustrate an exhaust gas flow regulator included in the HRSG of FIG. 1.

FIG. 2 is a perspective view to illustrate an exhaust gas flow regulator included in the HRSG of FIG. 1.

Figure 3A:
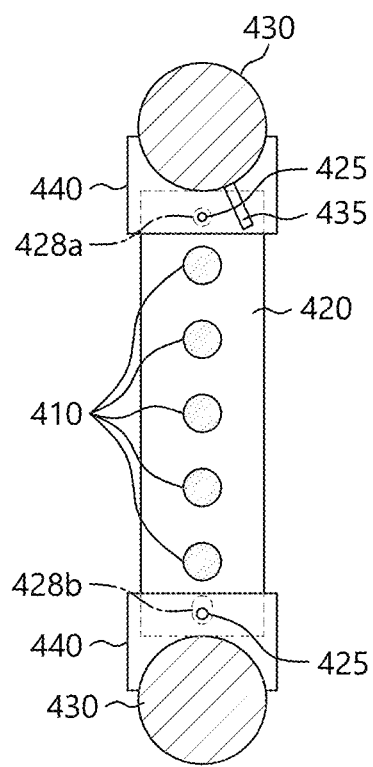
FIGS. 3A and 3B illustrate the exhaust gas flow regulator of FIG. 2 in front and side views respectively.
Figure 3B:
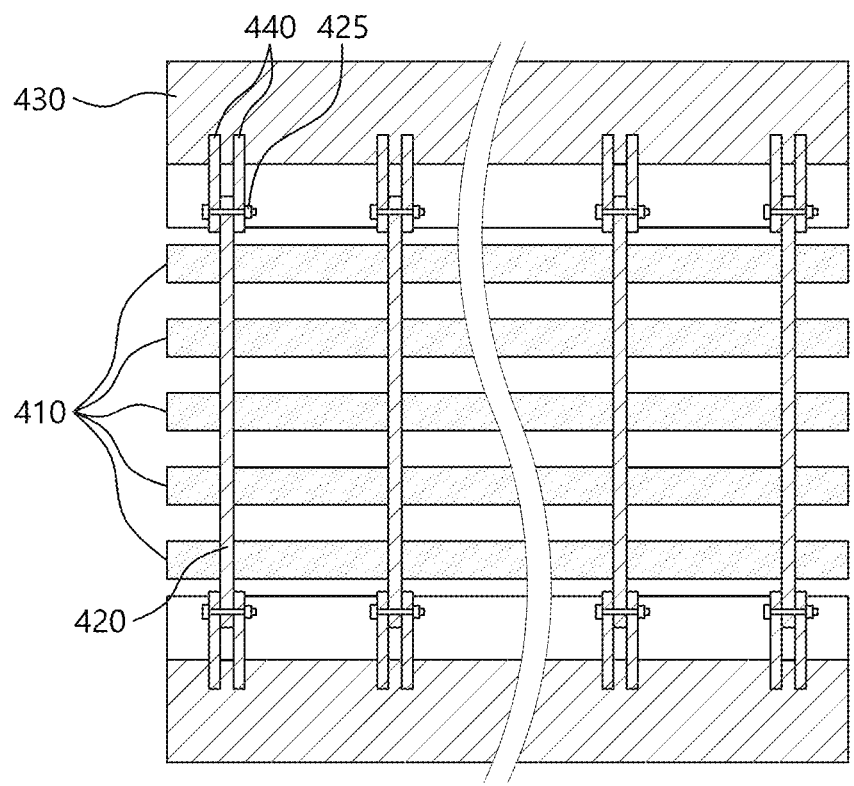
Figure 4:
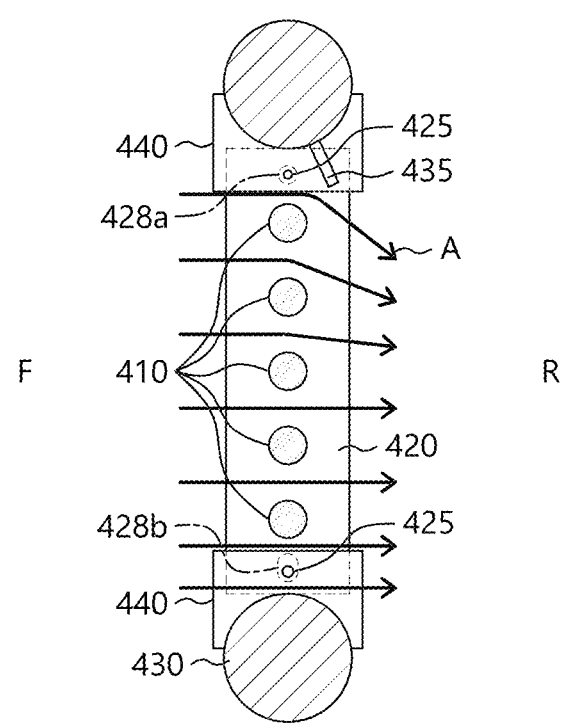
FIG. 4 is a diagram illustrating exhaust gases flowing through the exhaust gas flow regulator of FIG. 2.

FIGS. 3A and 3B illustrate the exhaust gas flow regulator of FIG. 2 in front and side views respectively. FIG. 4 is a diagram illustrating exhaust gases flowing through the exhaust gas flow regulator of FIG. 2.

Figure 5A:
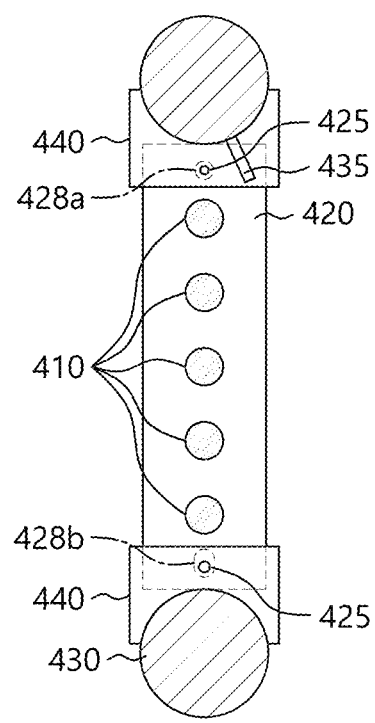
FIGS. 5A and 5B are diagrams illustrating a support plate expanding when the exhaust gas flow regulator of FIG. 2 is heated.
Figure 5B:
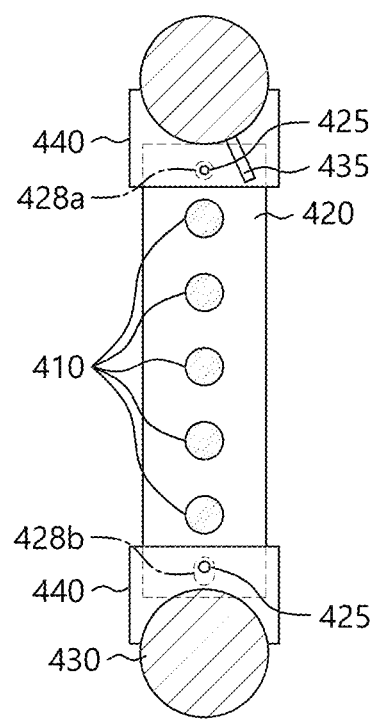

FIGS. 5A and 5B are diagrams illustrating a support plate expanding when the exhaust gas flow regulator of FIG. 2 is heated.

Figure 6:
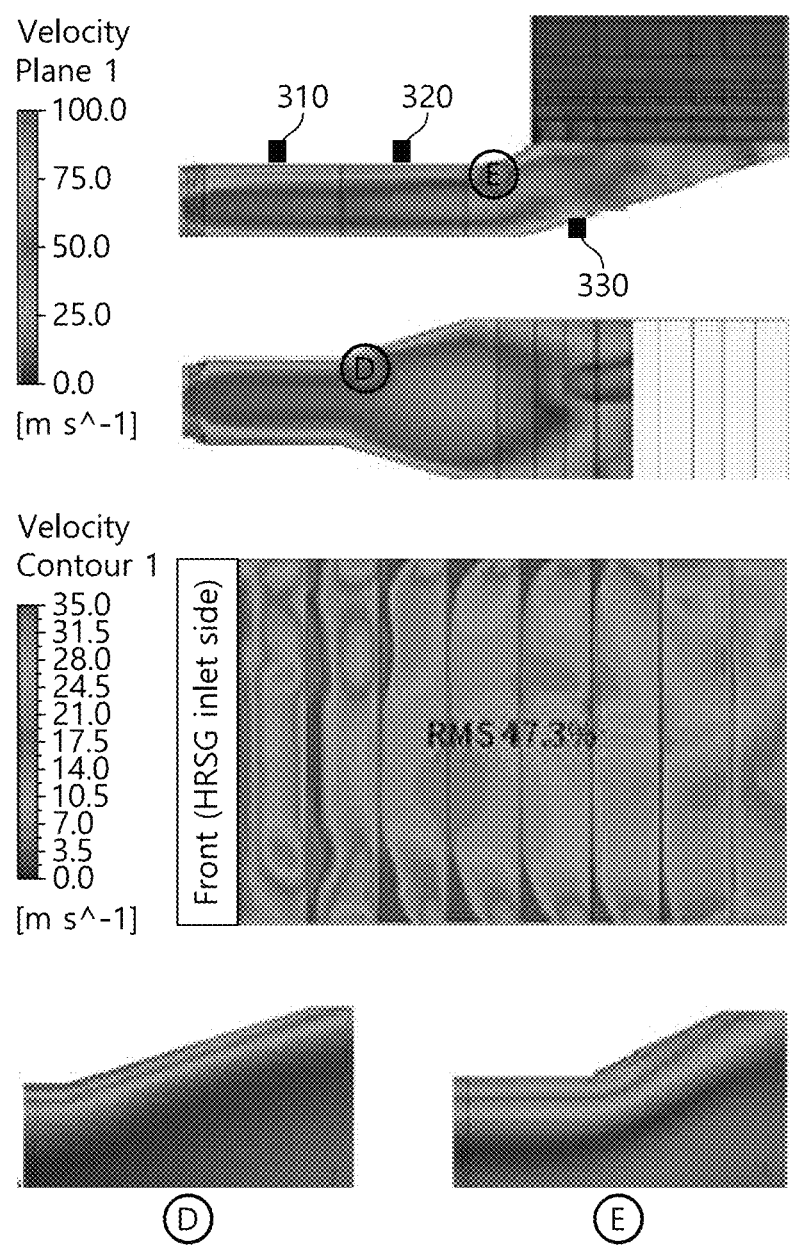
FIGS. 6-7 are diagrams illustrating a flow of exhaust gases in the HRSG without and with the exhaust gas flow regulator according to an embodiment of the present disclosure, respectively.
Figure 7:
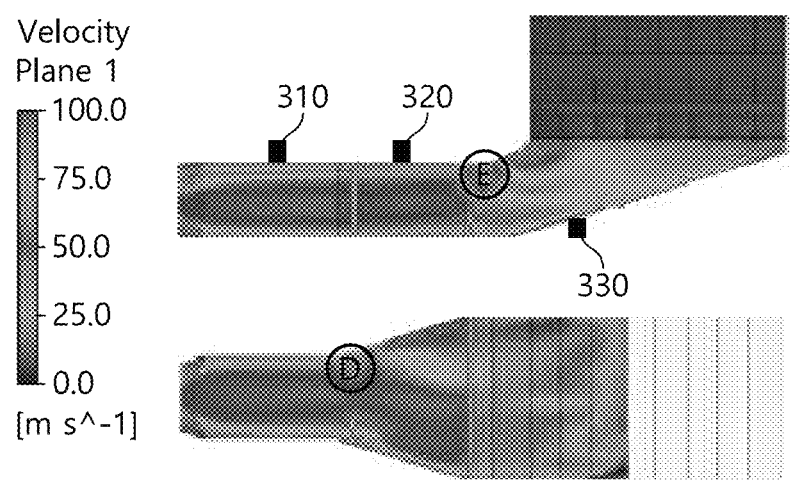
Figure 7:
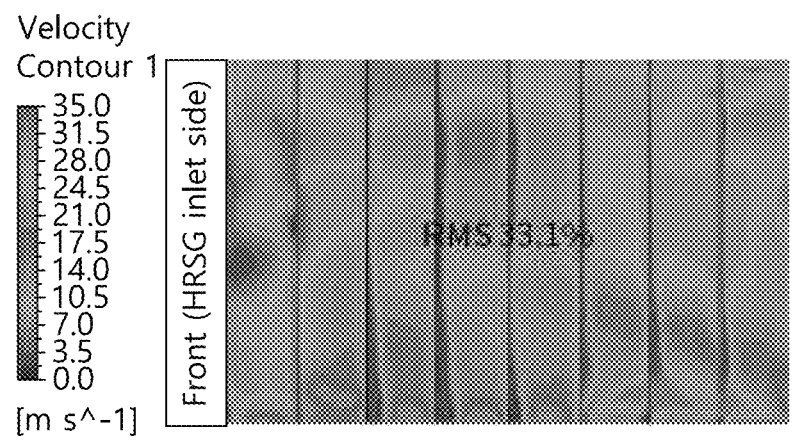
Figure 7:
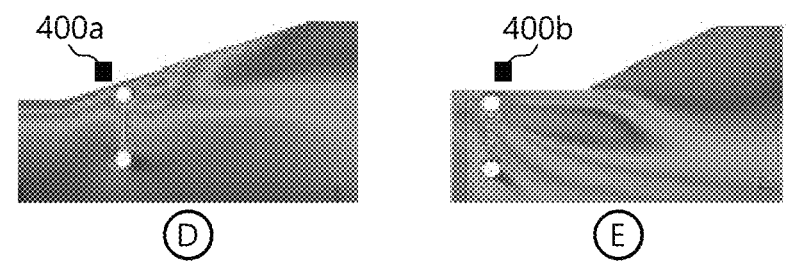

FIGS. 6-7 are diagrams illustrating a flow of exhaust gases in the HRSG without and with the exhaust gas flow regulator according to an embodiment of the present disclosure, respectively.

Referring to FIGS. 1-2, a heat recovery steam generator (HRSG) A according to an embodiment of the present disclosure recovers heat of high-temperature combustion exhaust gases discharged from a gas turbine during circulation of the exhaust gases therethrough. The HRSG A includes a stack 100, a heat transfer tube unit 200, an air duct 300, and an exhaust gas flow regulator 400.

The stack 100 is disposed in an exhaust passage at an end of the air duct 300. Specifically, the stack 100 may be disposed near a fifth flow path 350. In this case, one or more stacks 100 may be disposed. Specifically, the HRSG A may include a bypass duct, which may also be provided with a stack 100. The stack 100 is a passage through which exhaust gases generated in the HRSG A are finally discharged to the outside, and includes an upper opening in communication with the outside.

The heat transfer tube unit 200 is disposed below the stack 100. Specifically, the heat transfer tube unit 200 may be disposed in a fourth flow path 340. The heat of exhaust gases can be absorbed through heat transfer tubes 200 disposed in the heat transfer tube unit 200. That is, the heat transfer tubes absorb the waste heat of the exhaust gases. The heat transfer tubes may include fin-shaped heat sinks to have high heat absorption efficiency.

In this case, the fins around the heat transfer tubes may be composed of very thin iron plates. As a result, due to an inhomogeneous flow of exhaust gases or the like, damages such as micro cracks, distortion, delamination into thin sheets, or the like may occur to the heat transfer tubes.

The air duct 300 includes a plurality of flow paths with different cross-sectional areas through which exhaust gases flow from a gas turbine to the stack 100.

Specifically, the air duct 300 may include a first flow path 310 into which high-temperature exhaust gases from the gas turbine flows, a second flow path 320 extending from the first flow path 310 and increasing in cross-sectional area in a direction that is wider than the first flow path 310, and a third flow path 330 extending from the second flow path 320 and changing in the direction of the flow path in a height direction H with respect to the second flow path 320.

The exhaust gas flow regulator 400 may be disposed in the second flow path 320 and third flow path 330 described above.

Specifically, referring to FIG. 2, the exhaust gas flow regulator 400 may be disposed on a front side of the second flow path 320 or the third flow path 330. In other words, the exhaust gas flow regulator 400 may be disposed on the side of the corresponding flow path when the cross-sectional area of the flow path changes in the width or height direction H of the flow path, or when the direction of the flow path changes.

Referring to FIGS. 3A and 3B and the like, the exhaust gas flow regulator 400 will be described as follows.

The exhaust gas flow regulator 400 includes first tubes 410, a support plate 420, and second tubes 430.

Specifically, five first tubes 410 are provided so as to be spaced apart from each other in a vertical direction. As shown, the five first tubes 410 may be spaced apart in the vertical direction in the drawing. Exhaust gases may flow through the first tubes 410 homogeneously in the vertical direction with respect to the longitudinal direction of the first tubes 410.

The support plate 420 is disposed in a direction perpendicular to the extension direction of the first tubes 410. The first tubes 410 are formed to penetrate through the support plate 420.

Specifically, referring to FIGS. 3A and 3B, the support plate 420 is disposed in a direction perpendicular to the longitudinal direction of the first tubes 410. The first tubes 410 penetrate through and are fixed to the support plate 420. This may prevent the first tubes 410 from being moved or rotated due to a flow of exhaust gases.

The second tube 430 is disposed on at least one end of the support plate 420. The second tube 430 is coupled to the support plate 420 and extends parallel to the first tubes 410. That is, the first tubes 410 and the second tube 430 are disposed parallel to each other. The second tubes 430 may be disposed at both ends of the support plate 420, respectively.

The exhaust gas flow regulator 400 may further include a coupling plate 440. The coupling plate 440 may have a first end coupled to the second tube 430 and a second end coupled to an end of the support plate 420. Accordingly, the coupling plate 440 may couple the support plate 420 and the second tube 430 to each other. In this case, the support plate 420 and the coupling plate 440 may be coupled by bolts 425.

Here, bolt 425 holes are formed at both ends of the support plate 420 for engagement with the coupling plate 440. One of the bolt 425 holes formed at both ends of the support plate 420 may be formed as a vertically extending long hole.

For example, referring to FIGS. 3A and 3B, a first bolt hole 428a and a second bolt hole 428b may be formed at both ends of the support plate 420. In this case, the first bolt hole 428a may not be formed as a long hole, whereas the second bolt hole 428b may be formed as a long hole extending in the vertical direction.

As high-temperature exhaust gases flow through the exhaust gas flow regulator 400, the support plate 420 having a relatively large area may be thermally expanded. Here, since the second bolt hole 428b is formed as a long hole extending in the vertical direction, an increase in length caused by the thermal expansion of the support plate 420 may be absorbed by the second bolt hole 428b.

Specifically, referring to FIG. 5A, the support plate 420 prior to thermal expansion is illustrated. In FIG. 5A, the bolt 425 is inserted into the second bolt hole 428b of the support plate 420 so as to be disposed on the lower side of the second bolt hole 428b.

In FIG. 5B, the support plate 420 after expanded by the heat of the exhaust gases is illustrated. In FIG. 5B, the bolt 425 is inserted into the second bolt hole 428b of the support plate 420 so as to be disposed on the upper side of the second bolt hole 428b.

At this time, although the positions of the second tube 430 and the bolt 425 on the lower side of the support plate 420 in FIG. 5B remain unchanged, the support plate 420 may increase in length in the vertical direction, so that the bolt 425 inserted into the second bolt hole 428b can be moved toward the upper side of the second bolt hole 428b along the second bolt hole 428b.

In the exhaust gas flow regulator 400 according to the embodiment of the present disclosure, the coupling plate 440 coupled with the second tube 430 and the support plate 420 having a long hole extending in the vertical direction are connected to each other by bolts 425 such that the bolts 425 are movable along the long hole, which has the effect of absorbing thermal expansion of the support plate 420.

The second tube 430 may include a guide plate 435 disposed such that a flow of exhaust gases flowing adjacent to the second tube 430 is redirected toward the first tube 410.

Referring to FIG. 4, the guide plate 435 protrudes from the second tube 430 at an angle toward the first tube 410, and a flow of exhaust gases flowing through the second tube 430 and the first tubes 410 may be redirected by the guide plate 435.

Specifically, the exhaust gases flow from one side to the other around the first tubes 410. That is, the exhaust gases flow from a front side F of the exhaust gas flow regulator 400 to a rear side R of the exhaust gas flow regulator 400 with respect to the first tubes 410.

Here, the guide plate 435 may redirect the exhaust gases flowing from one side to the other side of the first tube 410.

Specifically, referring to FIG. 4, a flow A of exhaust gases will be described as follows. The exhaust gases flowing from a portion close to the guide plate 435 are subjected to a relatively large change in flow direction by the guide plate 435. Due to the large change in flow direction by the guide plate 435, a change in flow direction of the exhaust gases flowing through the first tubes 410 adjacent to the guide plate 435 may also occur.

Then, as the exhaust gases flow toward the rear side R of the exhaust gas flow regulator 400, due to the exhaust gas redirected by the guide plate 435, the flow of exhaust gases flowing through the first tubes 410 may be generally formed downwardly as shown in FIG. 4.

The guide plate 435 may be rotatably connected to the second tube 430 to guide the exhaust gases flowing between the second tube 430 and the first tube 410 adjacent to the second tube 430 to be redirected toward the first tube 410.

Referring to FIG. 4, exhaust gases flows from the front side F to the rear side R of the exhaust gas flow regulator 400. At this time, the flowing exhaust gases may flow through the first tube 410, and between the first tube 410 and the second tube 430.

However, the guide plate 435 extends obliquely from the second tube 430 toward the first tube 410. Accordingly, the exhaust gases flowing between the second tube 430 having the guide plate 435 and the first tube 410 disposed adjacent to the second tube 430 are redirected by the guide plate 435.

That is, as illustrated in FIG. 4, the exhaust gases flowing from the front side F to the rear side R of the exhaust gas flow regulator 400 may be redirected to the center of the first tube 410 by the guide plate 435.

Meanwhile, the guide plate 435 may be disposed on either of the second tubes 430 disposed on both ends of the support plate 420.

Specifically, referring to FIG. 2, a first exhaust gas flow regulator 400a, a second exhaust gas flow regulator 400b, and a third exhaust gas flow regulator 400c are disposed. The first exhaust gas flow regulator 400a, second exhaust gas flow regulator 400b, and third exhaust gas flow regulator 400c have the same or similar components except for the position and angle of the second tube 430 at which the guide plate 435 is disposed.

The first exhaust gas flow regulator 400a is disposed on an inlet portion of the second flow path 320, adjacent to the space between the first flow path 310 and the second flow path 320.

The second flow path 320 extends from the first flow path 310 and is formed to be wider in the width direction W than the first flow path 310. In this case, exhaust gases may flow along both sides of the second flow path 320 in the width direction W. Accordingly, the exhaust gas flow regulator 400 is arranged to regulate a flow of exhaust gases flowing adjacent to the surface of the flow path.

At this time, a guide plate 435 may protrude from each of the second tubes 430 of the first exhaust gas flow regulator 400a, the second exhaust gas flow regulator 400b, and the third exhaust gas flow regulator 400c adjacent to the surface of the air duct 300. In this way, the guide plate 435 may be disposed to allow the exhaust gases to flow away from the surface of the air duct 300 forming the second flow path 320. However, in the case of the third exhaust gas flow regulator 400c, no guide plate 435 may be provided as the need to guide the flow of exhaust gases is not as great.

The exhaust gas flow regulator 400 may be disposed between the first flow path 310 and the second flow path 320 so as to be disposed in the height direction H at both ends of a width extending and expanding from the first flow path 310 to the second flow path 320. Further, the guide plate 435 may be disposed on the second tube 430, which is disposed close to a surface forming the air duct 300.

Specifically, in the first exhaust gas flow regulator 400a, the guide plate 435 is disposed on the second tube 430 disposed adjacent to the surface forming the second flow path 320. The guide plate 435 is fixed to the second tube 430 so as to allow exhaust gases flowing between the second tube 430 and the first tube 410 adjacent to the second tube 430 to flow away from the surface forming the second flow path 320.

The guide plate 435 may be disposed such that the flow direction of exhaust gases flowing from the first flow path 310 toward the second flow path 320 is redirected toward the first tube 410. For example, referring to FIG. 4, the guide plate 435 may be configured to allow exhaust gases flowing from the front side F to the rear side R of the exhaust gas flow regulator 400 to flow away from the guide plate 435.

In other words, the guide plate 435 may be configured to allow the flow direction of the exhaust gases flowing adjacent to the surface forming the flow path to flow toward the center of the flow path.

The exhaust gas flow regulator 400 may be disposed between the second flow path 320 and the third flow path 330 at both ends of the direction in which the flow path redirects from the second flow path 320 to the third flow path 330. Further, the guide plate 435 may be disposed to allow the exhaust gases to flow toward the center of the third flow path 330.

Specifically, the second exhaust gas flow regulator 400b and the third exhaust gas flow regulator 400c are disposed on an inlet portion of the third flow path 330 adjacent to the space between the second flow path 320 and the third flow path 330.

The third flow path 330 may be divided into a first portion 331 before the flow path is redirected in the height direction H and a second portion 332 after the flow path is redirected in the height direction H. The second exhaust gas flow regulator 400b and the third exhaust gas flow regulator 400c may be disposed in the first portion 331 of the third flow path 330. However, if the third flow path 330 does not include the first portion 331 and the second portion 332, the second exhaust gas flow regulator 400b and the third exhaust gas flow regulator 400c may be disposed on an inlet portion of the third flow path 330.

The second exhaust gas flow regulator 400b may be disposed on an upper side of the third flow path 330 in the height direction H. Then, the guide plate 435 is disposed on the second tube 430 disposed close to the upper side of the third flow path 330 so that the exhaust gases flowing along the upper side of the third flow path 330 in the height direction H can flow downward. The exhaust gases may be redirected to flow toward the center of the flow path along the guide plate 435.

The third exhaust gas flow regulator 400c may be disposed on a lower side of the third flow path 330 in the height direction H. Then, the guide plate 435 is disposed on the second tube 430 disposed close to the lower side of the third flow path 330 in the height direction H so that the exhaust gases flowing along the lower side of the third flow path 330 can flow upward. The exhaust gases may be redirected to flow toward the center of the flow path along the guide plate 435.

As described above, the exhaust gas flow regulator 400 according to the embodiment of the present disclosure may be disposed along the both sides of the expanding width. Further, the exhaust gas flow regulator 400 may be formed to be elongated longitudinally along the both sides of the flow path when the direction of the flow path is changed.

Specifically, when extending from the first flow path 310 to the second flow path 320, the flow path extends along the width direction W. Accordingly, the first exhaust gas flow regulator 400a is disposed in close proximity to the inner surface on both sides of the width direction W. The first exhaust gas flow regulator 400a is elongated in shape and installed vertically along the height direction H. Further, when extending from the second flow path 320 to the third flow path 330, the flow path has an upward slope along the height direction H. Accordingly, the second exhaust gas flow regulator 400b and the third exhaust gas flow regulator 400c may be disposed on both sides of the third flow path 330 in the height direction H.

In accordance with the embodiment described in this disclosure, the exhaust gas flow regulator 400 is positioned on both sides close to the inner surface of the flow path where the width or height of the flow path can be adjusted. This arrangement facilitates the dispersion of exhaust gases that flow along the outer side of the flow path towards its center.

Further, the exhaust gas flow regulator 400 according to the embodiment of the present disclosure occupies only a portion of the cross-sectional area of the air duct 300 flow path, thereby having the effect of reducing the resistance to exhaust gases flowing through the center of the air duct 300 flow path. Specifically, since the exhaust gas flow regulator 400 is disposed close to the surface of the flow path, while maintaining a predetermined distance from the surface of the flow path, the regulator only regulates the flow of exhaust gases along the surface of the flow path without providing resistance to the exhaust gases flowing through the center of the flow path, thereby having the effect of facilitating the flow of the exhaust gases flowing through the center of the flow path.

Furthermore, the exhaust gas flow regulator 400 according to the embodiment of the present disclosure occupies only a small portion of the cross-sectional area of the air duct 300 flow path, thereby having the effect of reducing the number of parts required to construct the heat recovery steam generator A and reducing the time required for assembly.

The guide plate 435 may be rotated with respect to the second tube 430. That is, the direction of the guide plate 435 may be redirected. Specifically, an angle defined by the straight line between the second tube 430 and the guide plate 435 and the straight line connecting the second tube 430 and the first tube 410 may be changed.

However, referring to FIG. 4, even when the guide plate 435 is rotated with respect to the second tube 430, since the guide plate 435 is configured to redirect the flow direction of the exhaust gases flowing from the front side F to the rear side R of the exhaust gas flow regulator 400, the guide plate 435 is preferably disposed toward the rear side R of the exhaust gas flow regulator 400, rather than toward the front side F of the exhaust gas flow regulator 400, with respect to the first tubes 410.

The exhaust gas flow regulator 400 according to the embodiment of the present disclosure may cover not the entire area of the flow path, but only one or both sides of the flow path formed by the air duct 300. Therefore, compared to the exhaust gas flow regulator 400 that covers the entire area of the flow path, the size may be smaller, the number of parts may be reduced, and the portions that obstruct the flow of the exhaust gas may be eliminated.

Referring to FIGS. 6-7, the flow of exhaust gases will be illustrated for the case in which the exhaust gas flow regulator 400 is not disposed and the case in which the exhaust gas flow regulator 400 is disposed.

FIG. 6 illustrates the cases in which the exhaust gas flow regulator 400 is not disposed inside the air duct 300. In these cases, it can be seen that the root mean square (RMS), which is the distribution of exhaust gases flowing through the first flow path 310, the second flow path 320, and the third flow path 330, is about 47.3%.

In addition, FIG. 7 illustrates the cases in which the exhaust gas flow regulator 400 is disposed inside the air duct 300. Specifically, the first exhaust gas flow regulator 400a, the second exhaust gas flow regulator 400b, and the third exhaust gas flow regulator 400c described above are disposed inside the air duct 300.

It can be seen that the RMS, which is the distribution of exhaust gases flowing through the first flow path 310, the second flow path 320, and the third flow path 330, is about 33.1%.

In other words, it can be seen that under the same conditions, the RMS is reduced by about 13.2% in the presence of the exhaust gas flow regulator 400 compared to the absence of the exhaust gas flow regulator 400. That is, it is evident that the distribution of the exhaust gas flow is relatively uniform.

Figure 8:
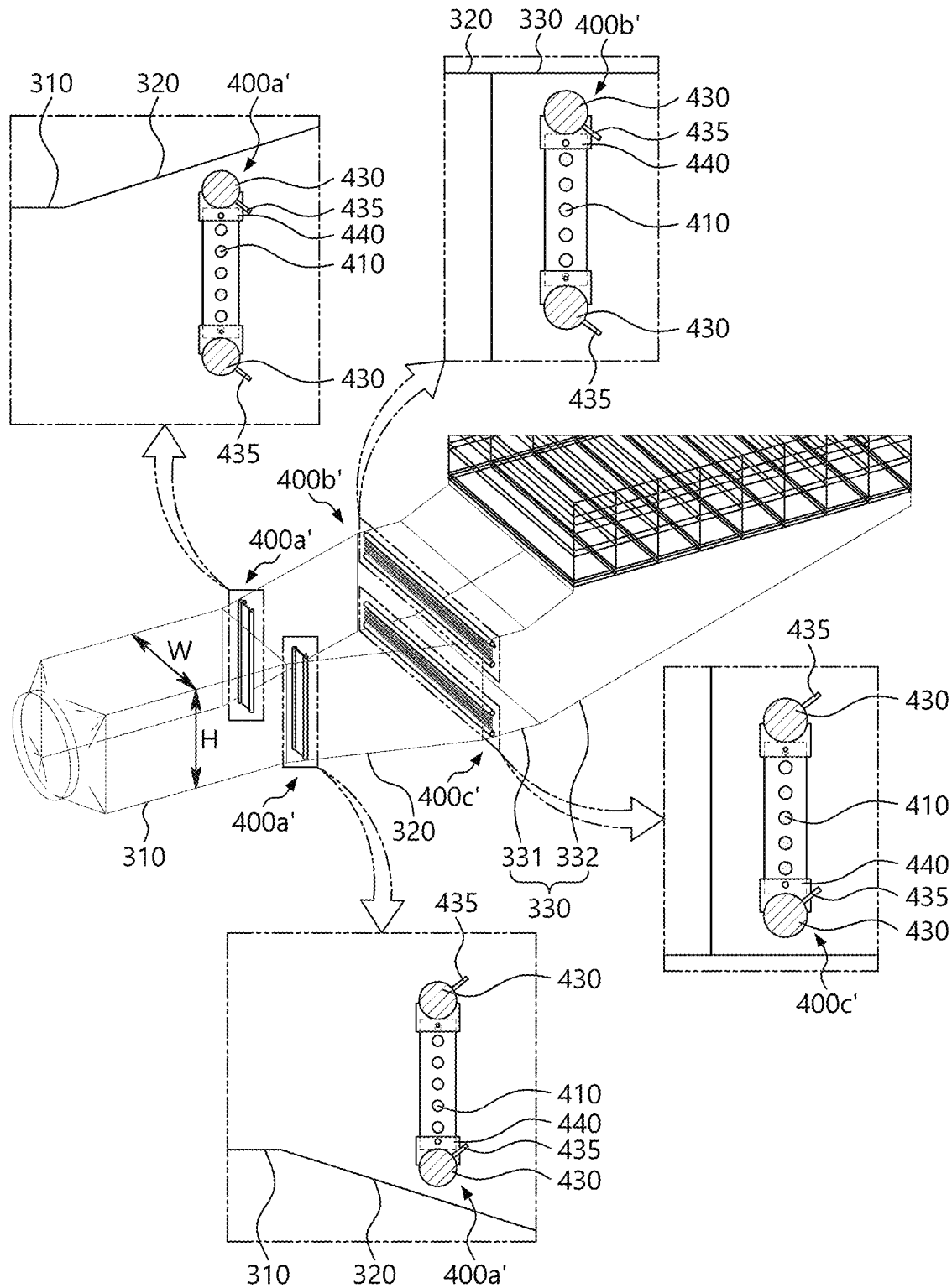
FIG. 8 is a perspective view illustrating the exhaust gas flow regulator included in the HRSG according to another embodiment of the present disclosure.

FIG. 8 is a perspective view illustrating an exhaust gas flow regulator 400 included in the HRSG A according to another embodiment of the present disclosure.

The HRSG A and the exhaust gas flow regulator 400 according to this embodiment has the same or similar components as the exhaust gas flow regulator 400 described in FIGS. 1 to 5, except for the number and position of the guide plates 435 protruding from the second tube 430, so a detailed description thereof will be omitted.

Referring to FIG. 8, a first exhaust gas flow regulator 400a' is formed on an inlet portion of the second flow path 320 so as to extend along the height direction H on both sides of the width direction W of the second flow path 320.

At this time, the first exhaust gas flow regulators 400*a*' may be disposed on both sides of the second flow path 320, respectively.

In addition, a guide plate 435 of the second flow path 320 may be disposed on both of the second tubes 430 disposed on both sides of the support plate 420. Further, the guide plates 435 of the exhaust gas flow regulators 400 may be formed in the same direction.

This allows exhaust gases flowing along the side forming the flow path to flow more toward the center of the flow path.

In addition, a second exhaust gas flow regulator 400*b*' and a third exhaust gas flow regulator 400*c*' may also be provided with guide plates 435 on both sides of the second tube 430. This allows the exhaust gases to be guided toward the center of the second tube 430 even when the direction of the flow path is changed.

Figure 9:
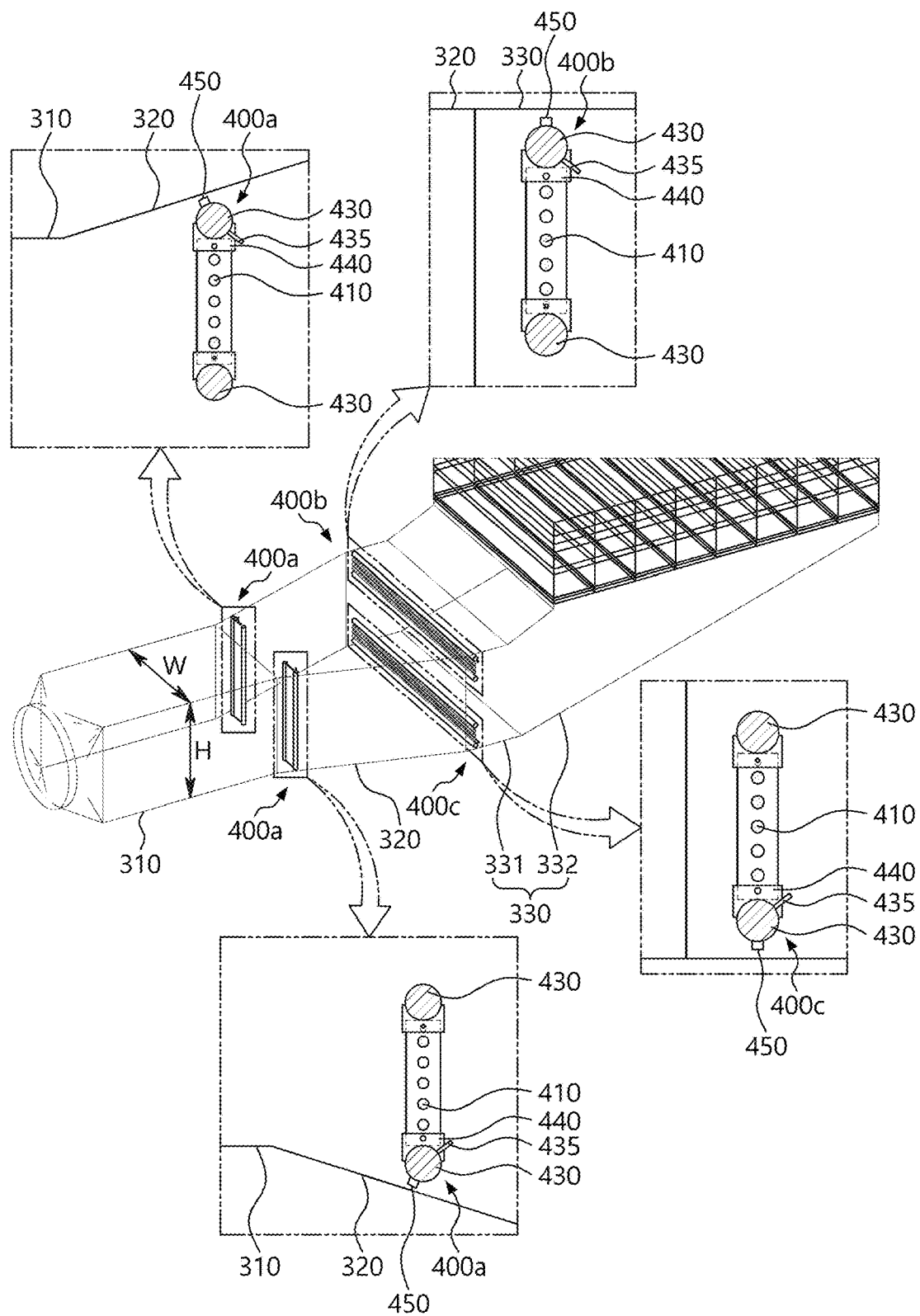
FIG. 9 is a perspective view illustrating the exhaust gas flow regulator included in the HRSG according to another embodiment of the present disclosure.
Figure 10A:
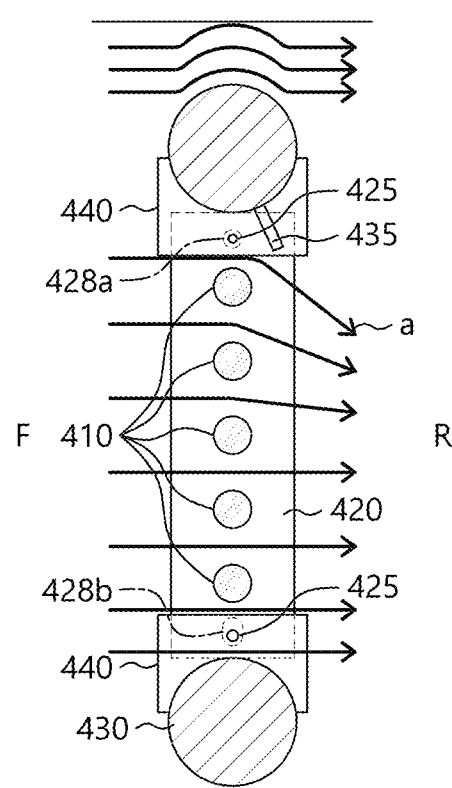
FIGS. 10A and 10B are diagrams illustrating a change in a flow of exhaust gases close to the surface of an air duct by an edge plate of the exhaust gas flow regulator of FIG. 9.
Figure 10B:
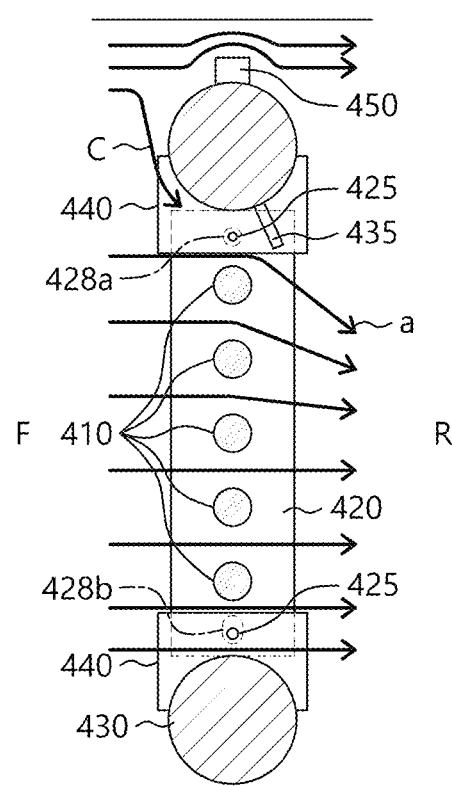

FIG. 9 is a perspective view illustrating the exhaust gas flow regulator 400 included in the HRSG A according to another embodiment of the present disclosure. FIGS. 10A and 10B are diagrams illustrating a change in a flow of exhaust gases close to the surface of an air duct by an edge plate of the exhaust gas flow regulator of FIG. 9.

The exhaust gas flow regulator 400 included in the HRSG of FIG. 9 has the same or similar components as the exhaust gas flow regulator 400 of the former embodiments, except for additional provision of an edge plate 450, so a detailed description thereof will be omitted.

The second tube 430 of the exhaust gas flow regulator 400 according to the embodiment of the present disclosure may further include the edge plate 450 rotatably coupled to the second tube 430.

Referring to FIG. 9, the second tube 430 of the exhaust gas flow regulator 400 may further include, in addition to the guide plate 435, an edge plate 450 disposed to face a wall forming the air duct 300. Further, the edge plate 450 may be disposed between the second tube 430 and a surface forming the air duct 300 through which exhaust gas flows.

As such, the edge plate 450 can guide exhaust gases flowing between the wall surface forming the air duct 300 and the second tube 430 to flow between the second tube 430 and the first tube 410.

Specifically, referring to FIG. 10A, when the edge plate 450 is not included, exhaust gases may flow fast between the wall surface forming the air duct 300 and the second tube 430.

Turning now to FIG. 10B, where the second tube 430 further includes the edge plate 450, it can be seen that a portion C of the exhaust gases flowing between the wall surface forming the air duct 300 and the second tube 430 is directed between the second tube 430 and the first tube 410.

That is, the edge plate 450 disposed between the surface forming the air duct 300 and the second tube 430 can reduce an area of the flow path between the wall surface of the air duct 300 and the second tube 430. This can reduce a flow rate of exhaust gases flowing between the wall surface of the air duct 300 and the second tube 430. Further, the edge plate 450 may direct a portion of exhaust gases flowing between the wall surface of the air duct 300 and the second tube 430 to a portion between the second tube 430 and the first tube 410. Accordingly, the exhaust gases directed between the second tube 430 and the first tube 410 may flow toward the center of the air duct 300.

Respective configurations of the invention described in the above detailed description are not to be construed as limiting in any respect and should be considered exemplary. The scope of the invention shall be determined by a reasonable interpretation of the appended claims, and all changes within the equivalents of the invention shall be included in the scope of the invention.

What is claimed is:

1. An exhaust gas flow regulator comprising:
   a plurality of first tubes spaced apart from each other in a vertical direction and elongated in an extension direction;
   a support plate disposed perpendicular to the extension direction and through which the plurality of first tubes penetrates; and
   a pair of second tubes, having a larger diameter than the plurality of first tubes, disposed at a first end of the support plate and a second end of the support plate, and extending parallel to the plurality of first tubes,
   two pairs of coupling plates disposed perpendicular to the extension direction, a first pair of the two pairs of coupling plates directly coupling a first one of the second tubes to the first end of the support plate, and a second pair of the two pairs of coupling plates directly coupling a second one of the second tubes to the second end of the support plate;
   wherein at least one of the pair of second tubes is provided with a guide plate configured to redirect exhaust gases flowing around the at least one of second tubes toward the plurality of first tubes.

2. The exhaust gas flow regulator according to claim 1, wherein the guide plate is rotatably connected to the at least one of the pair of second tubes so that a flow direction of the exhaust gases flowing between the at least one of the pair of second tubes and a first tube of the plurality of first tubes adjacent to the at least one of the pair of second tubes is directed toward the first tube of the plurality of first tubes.

3. The exhaust gas flow regulator according to claim 1, wherein the exhaust gases flow from one side of the plurality of first tubes to the other side of the plurality of first tubes, and the guide plate is configured to redirect the exhaust gases flowing from the one side of the plurality of first tubes toward the other side of the plurality of first tubes.

4. The exhaust gas flow regulator according to claim 1, wherein the support plate and the two pairs of coupling plates are coupled together by bolts.

5. The exhaust gas flow regulator according to claim 4, wherein the first end of the support plate and the second end of the support plate are each provided with bolt holes formed for engagement with the two pairs of coupling plates, and one of the bolt holes is formed as a long hole extending in the vertical direction.

6. The exhaust gas flow regulator of claim 5, wherein the support plate is provided in a plurality and a count of the plurality of support plates are three or more.

7. The exhaust gas flow regulator of claim 6, wherein each of the plurality of support plates is integrally formed from a top to a bottom in a height direction.

8. The exhaust gas flow regulator of claim 7, wherein a length of the plurality of support plates in the vertical direction is smaller than a distance between two axes of the pair of second tubes and longer than a distance between upper-most one and lower-most one of the plurality of first tubes in the height direction.

9. The exhaust gas flow regulator according to claim 1, wherein one of the pair of second tubes further comprises an edge plate extending along and rotatably coupled to the one of the pair of second tubes.

10. The exhaust gas flow regulator according to claim 9, wherein the edge plate is connected to a side of the one of the pair of second tubes that is opposite to a location where the support plate is coupled to the one of the pair of second tubes.

11. A heat recovery steam generator (HRSG) designed to facilitate a recovery of heat from high-temperature exhaust gases discharged from a gas turbine, the HRSG comprising:
at least one stack;
an air duct including a plurality of flow paths having different cross-sectional areas and through which the exhaust gases flow from the gas turbine to the stack; and
an exhaust gas flow regulator disposed in the air duct, the exhaust gas flow regulator comprising:
a plurality of first tubes spaced apart from each other in a spacing direction and elongated in an extension direction perpendicular to the spacing direction;
a support plate disposed perpendicular to the extension direction and through which the plurality of first tubes penetrates; and
a pair of second tubes, having a larger diameter than the plurality of first tubes, disposed at a first end of the support plate and a second of the support plate, and extending parallel to the plurality of first tubes,
two pairs of coupling plates disposed perpendicular to the extension direction, a first pair of the two pairs of coupling plates directly coupling a first one of the second tubes to the first end of the support plate, and a second pair of the two pairs of coupling plates directly coupling a second one of the second tubes to the second end of the support plate;
wherein at least one of the pair of second tubes is provided with a guide plate configured to redirect the exhaust gases flowing around the at least one of second tubes toward the plurality of first tubes.

12. The HRSG according to claim 11, wherein the air duct includes a first flow path into which the exhaust gases from the gas turbine are introduced, a second flow path extending from the first flow path and having a cross-sectional area extending in a width direction of the air duct, and a third flow path extending diagonally from the second flow path in a height direction of the air duct.

13. The HRSG according to claim 12, wherein the width direction is parallel to the spacing direction and the exhaust gas flow regulator is positioned on two sides of the width direction on an inlet portion of the second flow path.

14. The HRSG according to claim 13, wherein the guide plate is disposed on one of the pair of second tubes that is nearer from a surface of the air duct.

15. The HRSG according to claim 14, wherein the guide plate is disposed such that a flow direction of the exhaust gases flowing from the first flow path to the second flow path is diverted toward the plurality of first tubes.

16. The HRSG according to claim 14, wherein the guide plate is disposed to allow the exhaust gases to flow away from the surface of the air duct forming the second flow path.

17. The HRSG according to claim 14, wherein the one of the pair of second tubes further includes an edge plate extending along and rotatably coupled to the one of the pair of second tubes, the edge plate being disposed between the surface forming the air duct and the one of the pair of second tubes.

18. The HRSG according to claim 12, wherein the height direction is parallel to the spacing direction and the exhaust gas flow regulator is positioned on two sides of the height direction on an inlet portion of the third flow path, the height direction indicating a direction where a flow path transitions from the second flow path to the third flow path.

19. The HRSG according to claim 18, wherein the guide plate is disposed to allow the exhaust gases to flow toward a center of the third flow path.

* * * * *